United States Patent
D'Souza et al.

(10) Patent No.: US 12,388,356 B2
(45) Date of Patent: Aug. 12, 2025

(54) BOOTSTRAP CIRCUITRY FOR DRIVING A HIGH-SIDE SWITCH OF A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

(*) Notice: Subject to any disclaimer, the term of this patent is extended or adjusted under 35 U.S.C. 154(b) by 237 days.

(21) Appl. No.: 18/055,842

(22) Filed: Nov. 16, 2022

(65) Prior Publication Data

US 2024/0030812 A1   Jan. 25, 2024

(30) Foreign Application Priority Data

Jul. 25, 2022   (IN) .............................. 202241042534

(51) Int. Cl.
*H02M 1/36* (2007.01)
*H02M 1/00* (2007.01)
(Continued)

(52) U.S. Cl.
CPC ........... *H02M 1/36* (2013.01); *H02M 1/0006* (2021.05); *H02M 1/08* (2013.01); *H02M 3/07* (2013.01)

(58) Field of Classification Search
CPC ........ H02M 1/08; H02M 1/088; H02M 3/158; H02M 3/1588; H02M 1/0006; H02M 3/07
See application file for complete search history.

(56) References Cited

U.S. PATENT DOCUMENTS

| | | | |
|---|---|---|---|
| 5,627,460 A | 5/1997 | Bazinet | |
| 8,497,714 B2 * | 7/2013 | Garbossa | H02M 3/155 327/108 |

(Continued)

FOREIGN PATENT DOCUMENTS

| | | |
|---|---|---|
| CN | 102832810 A | 12/2012 |
| CN | 103683864 A | 3/2014 |

(Continued)

OTHER PUBLICATIONS

Bootstrap Circuit in the Buck Converter, Nov. 2018, 05 pages.

(Continued)

*Primary Examiner* — Gustavo A Rosario-Benitez
(74) *Attorney, Agent, or Firm* — IPHORIZONS PLLC; Narendra Reddy Thappeta

(57) ABSTRACT

A voltage regulator containing a bootstrap capacitor, a switching converter and a pre-charging block. The bootstrap capacitor provides a required bias voltage for a high-side switch of the switching converter. The pre-charging block charges the bootstrap capacitor upon receipt of a wake-up signal. The high-side switch and a low-side switch of the switching converter together operate to generate an output voltage based on a control signal transitioning between a first logic state and a second logic state. The high-side switch is required to be biased at a 'second voltage' exceeding a threshold voltage for fully turning ON and generating the output voltage, with such 'second voltage' being provided by the bootstrap capacitor upon being charged. The wake-up signal is received before start of transitioning of the control signal.

20 Claims, 6 Drawing Sheets

(51) Int. Cl.
    *H02M 1/08*     (2006.01)
    *H02M 3/07*     (2006.01)

(56) References Cited

U.S. PATENT DOCUMENTS

| | | | |
|---|---|---|---|
| 10,686,377 B1* | 6/2020 | Lu | H02M 3/158 |
| 2005/0017768 A1 | 1/2005 | de Frutos | |
| 2005/0225374 A1 | 10/2005 | Ribarich | |
| 2011/0018613 A1 | 1/2011 | Wang | |
| 2012/0062011 A1 | 3/2012 | Jones et al. | |
| 2014/0191732 A1* | 7/2014 | Tseng | H02M 1/36 |
| | | | 320/166 |
| 2014/0217959 A1 | 8/2014 | Chen et al. | |
| 2015/0061611 A1* | 3/2015 | Li | H02M 3/1588 |
| | | | 323/235 |
| 2015/0077081 A1* | 3/2015 | Ejury | H02M 3/158 |
| | | | 327/109 |
| 2017/0033677 A1 | 2/2017 | Wu | |
| 2017/0324411 A1* | 11/2017 | Gong | H02M 3/07 |
| 2018/0004238 A1* | 1/2018 | Shen | G05F 1/462 |
| 2021/0391795 A1* | 12/2021 | Gandhi | H02M 3/1582 |
| 2022/0337149 A1* | 10/2022 | Ionescu | H02M 3/07 |
| 2025/0070645 A1* | 2/2025 | Yamakoshi | H02M 1/32 |

FOREIGN PATENT DOCUMENTS

| | | |
|---|---|---|
| CN | 105048805 A | 11/2015 |
| CN | 112542937 A | 3/2021 |
| JP | 2010200554 A | 9/2010 |
| JP | 2014007812 A | 1/2014 |

OTHER PUBLICATIONS

Laszlo Kiraly, Keeping the Bootstrap Capacitor Charged in Buck Converters, Aug. 12, 2022, 02 pages.

Christophe Basso, Precharged capacitor ensures high-side start-up, Aug. 17, 1995, 08 pages.

Cheng Huang, High-side NMOS power switch and bootstrap driver for high-frequency fully-integrated converters with enhanced efficiency, Symposium, May 2013, 05 pages, he Hong Kong University of Science and Technology, Clear Water Bay, Hong Kong.

International Search Report dated Dec. 18, 2023, for PCT Application No. PCT/IN2023/050713, filed on Jul. 25, 2023, 5 pages.

Written Opinion of the International Searching Authority dated Dec. 18, 2023, for PCT Application No. PCT/IN2023/050713, filed on Jul. 25, 2023, 5 pages.

\* cited by examiner

BOOTSTRAP CIRCUITRY FOR DRIVING A HIGH-SIDE SWITCH OF A SWITCHING CONVERTER

PRIORITY CLAIM

The instant patent application is related to and claims priority from the co-pending India provisional patent application entitled, "Bootstrap Fast Charge", Serial No.: 202241042534, Filed: 25 Jul. 2022, which is incorporated in its entirety herewith to the extent not inconsistent with the description herein.

RELATED APPLICATIONS

The instant application is related to the following co-pending US Patent Applications, which are all incorporated in their entirety herewith:

1. U.S. application Ser. No: 18/055,839, entitled "Emulating Current Flowing Through an Inductor Driven by a Combination of High Side Switch and a Low Side Switch in a Switching Converter", inventors Arnold D'Souza, et al, Filed: On even date herewith.
2. U.S. application Ser. No: 18/161,102, entitled "Implementation of a Power Stage in a Multi-Phase Voltage Regulator", inventors Arnold D'Souza, et al, Filed: On even date herewith.

BACKGROUND

Technical Field

Embodiments of the present disclosure relate generally to switching converters, and more specifically to bootstrap circuitry in switching converters.

Related Art

Switching converters refer to components which convert an input AC (alternating current) or DC (direct current) voltage of one magnitude to an output DC voltage of a desired magnitude by employing and operating switch(es), as is well known in the relevant arts. Switching converters find use as stand-alone power supplies, in voltage regulator modules used in several environments such as laptops, mobile phones, etc.

Switching converters often employ a pair of transistors referred to as high-side switch and low-side switch coupled in series, as is well known in the relevant arts. A bootstrap circuitry is often employed associated with a high-side switch, typically for providing a gate drive when the high-side switch is realized as an NMOS (n-type Metal Oxide Semiconductor) transistor.

Aspects of the present disclosure are directed to design of such a bootstrap circuitry to ensure desired operation in various scenarios.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure is directed to a voltage regulator. The voltage regulator contains a bootstrap capacitor, a switching converter and a pre-charging block. The bootstrap capacitor provides a required bias voltage for a high-side switch of the switching converter. The pre-charging block charges the bootstrap capacitor upon receipt of a wake-up signal.

According to another aspect, the high-side switch and a low-side switch of the switching converter together operate to generate an output voltage based on a control signal transitioning between a first logic state and a second logic state. The high-side switch is required to be biased at a 'second voltage' exceeding a threshold voltage for generating the output voltage, with such 'second voltage' being provided by the bootstrap capacitor upon being charged. The wake-up signal is received before an initial transition representing start of transitioning of the control signal between the first logic state and the second logic state, which enables the high-side switch to fully turn ON.

In an embodiment, the high-side switch is an n-type MOSFET (Metal Oxide Semiconductor Field Effect Transistor) comprising a gate terminal required to be biased at the 'second voltage' for being fully turned ON, and the bootstrap capacitor is coupled to provide the 'second voltage' to the gate terminal.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
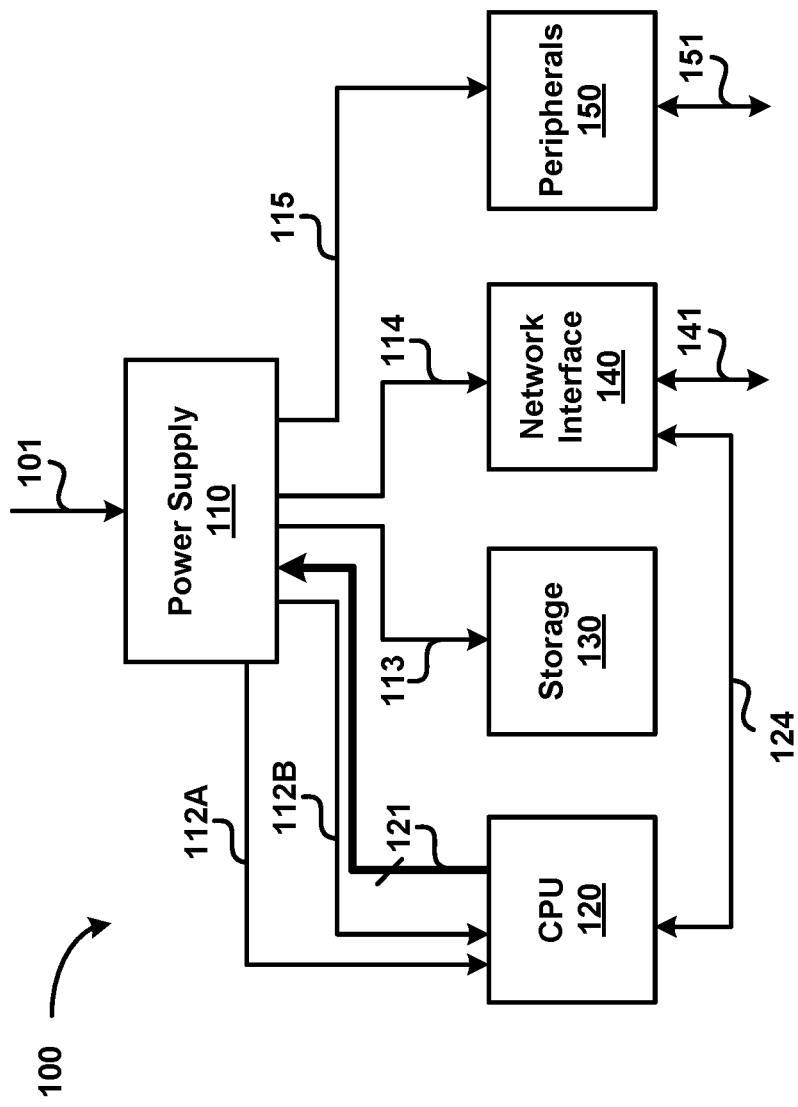
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase current output based on the specific signal (e.g., PS1, PS2 and PS3).

In an embodiment, power supply 110 is a voltage regulator module (VRM), sometimes also called processor power module (PPM), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module

Figure 2:
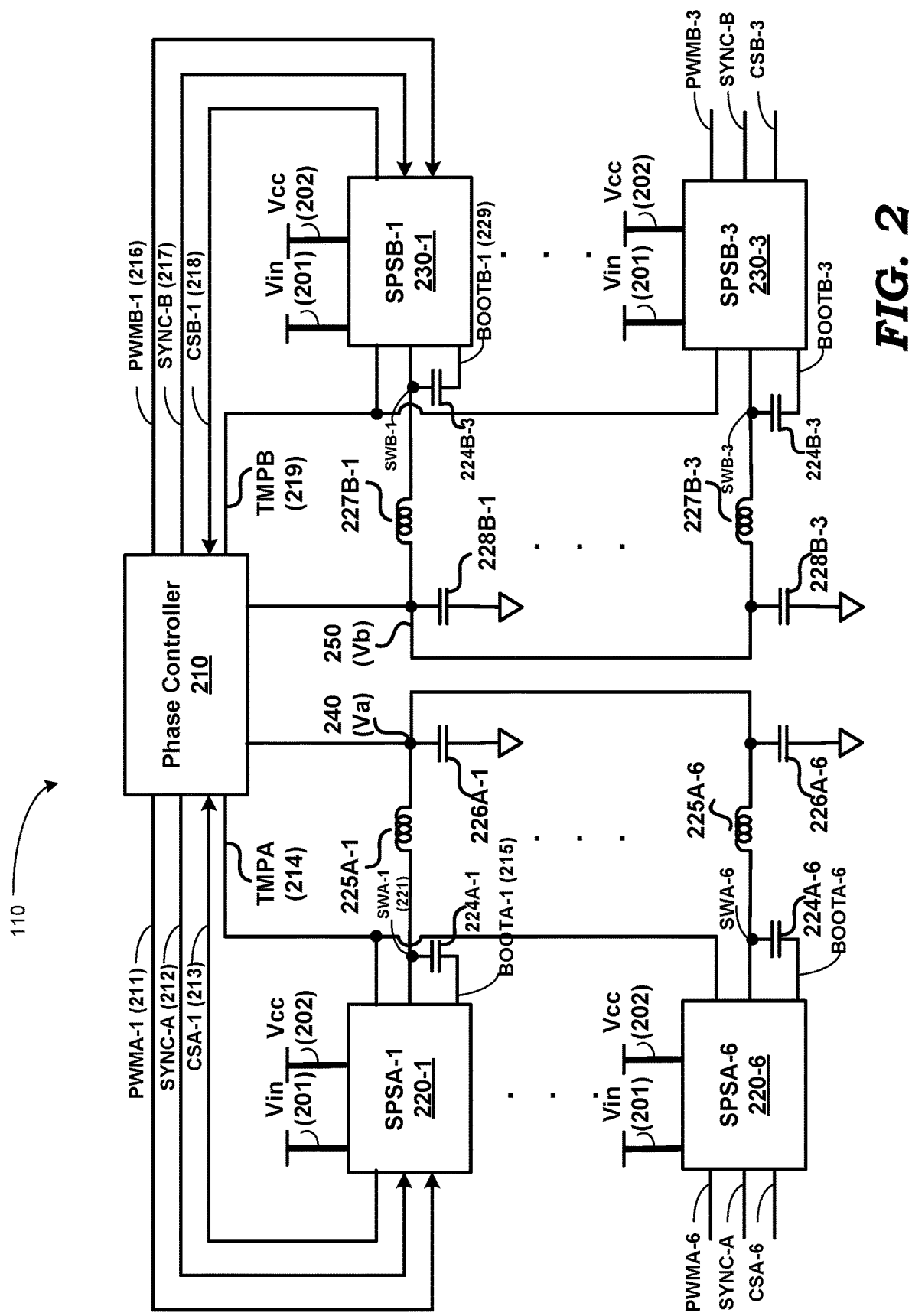
FIG. 2 is a block diagram illustrating the details of a voltage regulator module (VRM) in an embodiment of the present disclosure.

FIG. 2 is a block diagram illustrating the details of a VRM in an embodiment of the present disclosure. Power supply 110 is implemented as a Voltage Regulator Module and is shown containing phase controller 210, smart power stages (SPS) SPSA-1 (220-1) through SPSA-6 (220-6), SPSB-1 (230-1) through SPSB-3 (230-3), inductors 225A-1 through 225A-6, 227B-1 through 227B-3, output capacitors 226A-1 through 226A-6, 228B-1 through 228B-3, and bootstrap capacitors 224A-1 through 224A-6, 224B-1 through 224B-3. Each bootstrap capacitor associated with an SPS is shown connected between respective nodes SW and BOOT of the corresponding SPS. Thus, bootstrap capacitor 224A-1 is shown connected between node SWA-1 (221) and BOOTA-1 (215). Although bootstrap capacitor is shown connected external to each SPS, in alternative embodiments, bootstrap capacitor may be internal to the SPS.

Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/Paths 240 and 250 correspond to paths 112A and 112B respectively of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

Each SPS may be implemented to contain a high-side switch, a low-side switch, gate-drive circuitry for the two switches, a pre-charging block and other circuits. Examples of other circuits include but are not limited to temperature monitor circuit, inductor-current sense (or emulation) circuit, etc. to provide information, such as temperature of the SPS, magnitude of inductor current, etc. to phase controller 210. Each SPS receives a source of power as an input which is connected to the high-side switch (shown in detail in sections below). In FIG. 2, the supply source is numbered 201, and has a voltage Vin. Typical value of Vin in a VRM is about 21 volts (V). Each SPS is also shown as receiving bias voltage Vcc on path 202. Typical value of Vcc in a VRM is about 3.3 V.

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and provides a pulse-width modulated (PWM) signal, which may, for example, be a tri-state signal of fixed frequency. The PWM signal controls the opening and closing of high-side switch and low-side switch of the SPS. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same converter are staggered, i.e., delayed with respect to each other in phase such that typically no two high-side switches or low-side switches in the converter (i.e., respective SPSes) will be overlapping. Such a technique is employed for reasons such as, for example, to ensure that the peak instantaneous current drawing from Vin is relatively low (or zero) at all times.

In an embodiment, signal PWM represents tri-state input from phase controller 210. When logic LOW is detected by the SPS on signal PWM, the low-side switch is turned ON, and when logic HIGH is detected on signal PWM, the high-side switch is turned ON. A high-impedance (hi-Z) value on signal PWM is designed to turn OFF both the high-side and the low-side switches of the corresponding SPS. When an SPS is powered-up, a high-impedance (hi-Z) value is received on signal PWM for a certain duration before PWM starts to transition between the logic HIGH and logic LOW states noted above. An "initial transition" of signal PWM during power-up may therefore be regarded as transition from the hi-Z state to either HIGH state or LOW state.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSes of the same converter share a single SYNC signal. Signal SYNC is received before signal PWM starts to transition between logic HIGH and logic LOW states.

Signal CS (current sense) is an input to phase controller 210 from an SPS, and contains information regarding the magnitude of the inductor current of that phase. The information can be in the form of a current, voltage, digital values, etc.

Each SPS is shown associated with a corresponding bootstrap capacitor to drive the high-side switch in the SPS. Accordingly, the implementation details of an SPS in an embodiment of the present disclosure are described next.

4. Smart Power Stage (SPS)

Figure 3:
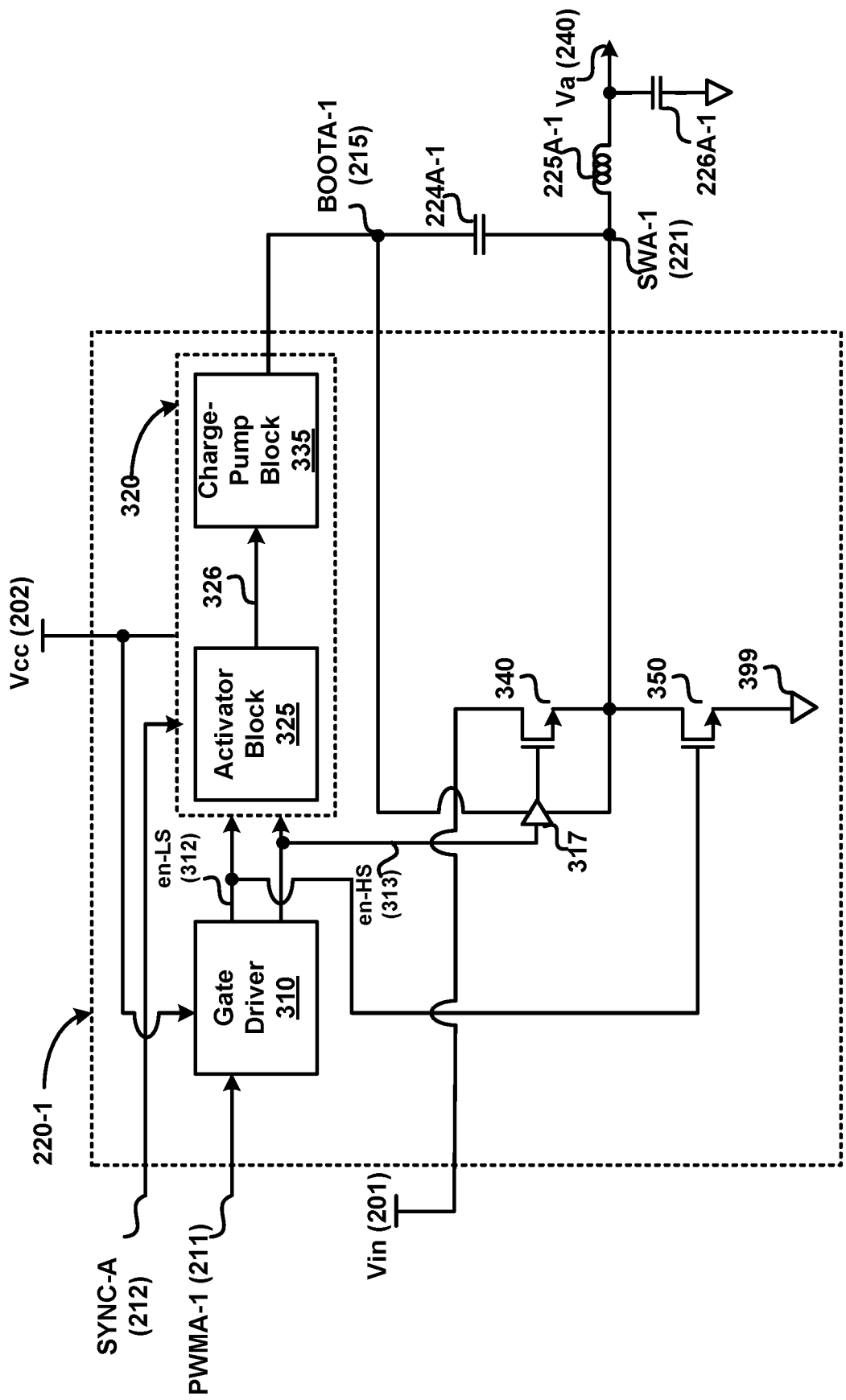
FIG. 3 is a block diagram illustrating the implementation of an SPS in an embodiment of the present disclosure.

FIG. 3 is a block diagram illustrating the implementation of an SPS in an embodiment of the present disclosure. SPSA-1 (220-1) is shown in detail in FIG. 3. The other SPSes can also be implemented to be similar to SPSA-1. However, in other embodiments, an SPS can have more or fewer blocks. SPSA-1 is shown containing gate driver 310, high-side (HS) switch 340, low-side (LS) switch 350, buffer 317, and pre-charging block 320. Pre-charging block 320 in turn is shown containing activator block 325 and charge-pump block 335. Also shown in FIG. 3 are inductor 225A-1, output capacitor 226A-1 and bootstrap capacitor 224A-1. Node 240 provides the supply voltage Va.

Gate driver 310 receives signal PWMA-1 (211), and in response to the logic level of PWMA-1 generates the appropriate voltage to turn ON and turn OFF HS switch 340 and LS switch 350 in corresponding intervals indicated by PWMA-1. Turning ON a switch implies that the switch is closed and therefore provides an electrical path across the switch terminals for conduction of current. HS switch 340 and LS switch 350 are each shown implemented as an n-type MOSFET (Metal Oxide Semiconductor Field Effect Transistor) with gate driver 310 driving the gate terminals of the MOSFETs, although other implementations for the switches having similar characteristics can benefit from the features described herein.

In the example of FIG. 3, when PWMA-1 is a logic HIGH (corresponding to a first logic state), gate driver 310 generates respective appropriate voltages on paths 312 (en-HS) and 313 (en-LS) to switch ON MOSFET 340 and switch OFF MOSFET 350. When PWMA-1 is a logic LOW (corresponding to a second logic state), gate driver 310 generates respective appropriate voltages on paths 312 and 313 to switch OFF MOSFET 340 and switch ON MOSFET 350.

In embodiments described herein, each of HS switch 340 and LS switch 350 is implemented using a respective n-type MOSFET, for advantages such as greater current capability with lower die area due to electrons having higher mobility than holes.

However, the gate terminal of an n-type MOSFET needs to be driven to a voltage whose magnitude is higher than the voltage at the source terminal by at least a threshold value (Vth1) in order to turn the switch ON, as is well known in the relevant arts. This requirement does not present a problem for LS switch as the source terminal of LS switch is coupled to ground (see FIG. 3), and voltage level corresponding to a logic HIGH on path 312 (en-LS) is sufficient to (substantially) exceed the threshold voltage of LS switch, thereby turning ON the LS switch.

In the case of HS switch, however, the gate terminal needs to be driven to a voltage whose magnitude is higher than Vin (201) in order to drive HS switch ON with a very low ON-resistance. This is needed since as HS switch starts turning ON, LS switch 350 has already been switched OFF, the voltage at node SWA-1 starts increasing towards Vin, and eventually equals Vin (which may be, for example, 21 volts or so). Therefore, the gate voltage of HS switch 340 may need to be at a minimum of Vin+Vth1 (threshold voltage of HS switch). To turn HS switch fully ON (so that it has a very low ON-resistance), the gate voltage may need to be sufficiently higher than (Vin+Vth1), and such higher voltage is denoted herein by (Vin+Vth1+Vgs-delta) (i.e., a second voltage exceeding a first threshold voltage by Vin+

Vgs-delta). Therefore, a bootstrap capacitor such as 224A-1 is employed to provide the supply voltage of buffer 317, so that buffer 317 can provide the necessary gate drive to fully turn-ON the HS switch, as is also well known in the relevant arts.

Bootstrap capacitor 224A-1 charges during the time period when en-LS (312) is a logic HIGH, and may lose some of the accumulated charge during the time period when en-HS (313) is a logic HIGH. The voltage at boot node (215) is close to bias voltage (Vcc, 202, which may for example be 3.3V) when en-LS is a logic HIGH, and rises to (Vin+Vth 1+Vgs-delta) when en-HS is a logic HIGH.

However, when the SPS is powered-up and the initial transition of PWMA-1 (211) signal is a logic HIGH (en-HS goes to logic HIGH first before en-LS going HIGH after power-up), in the absence of activator block 325 (and with only signal en-LS directly connected to path 326) bootstrap capacitor (224A-1) is not pre-charged prior to the activation (i.e., transitioning between logic levels) of PWMA-1 (211), thus being unable to provide the necessary gate drive to fully turn-ON HS switch 340.

It is therefore desirable to pre-charge bootstrap capacitor before PWMA-1 starts to transition between logic HIGH and logic LOW states. As described below, the remaining components of FIG. 3 operate to provide such a function.

Activator block 325 receives voltages en-LS and en-HS on paths 312 and 313 respectively, signal SYNC-A on path 212 and bias voltage (Vcc) on path 202, and generates pump-voltage on path 326. It is noted here that SYNC-A is activated by phase controller 210 prior to activation (i.e., transitioning between logic states) of PWMA-1. Activator block 325 generates pump-voltage 327 with a magnitude representing a logic HIGH voltage level (e.g., 3.3V) upon receipt of signal SYNC-A and also whenever en-LS (312) goes HIGH, as will be described in detail below. It is noted here than instead of SYNC-A from phase controller 210, an SPS can be designed to generate a similar signal locally at power-up and prior to PWMA-1 becoming active (transitioning between logic states).

Charge-pump block 335 receives pump-voltage on path 326, bias voltage (Vcc) on path 202, and generates boot voltage at node 215 (BOOTA-1). The boot voltage charges bootstrap capacitor 224A-1 during power-up, as will be described in detail below with examples. It should be understood that activator block 325 and charge-pump block 335 represent an example embodiment of pre-charging block 320. However, various alternative embodiments of pre-charging block 320 will be apparent to a skilled practitioner based on the disclosure herein. In addition, while pre-charging block 320 is shown internal to SPSA-1 220-1, it should be appreciated that the block can be implemented external to the SPSA-1, without departing from the scope and spirit of several aspects of the present disclosure. Pre-charging block 320 along with the bootstrap capacitor represent a bootstrap circuitry for driving high-side switch 340 according to aspects of the present disclosure.

The description is continued with example implementations of activator block 325 and charge-pump block 335, which are then used to illustrate the manner in which pre-charging block 320 charges bootstrap capacitor prior to the initial transition of PWM signal.

5. Activator Block

Figure 4:
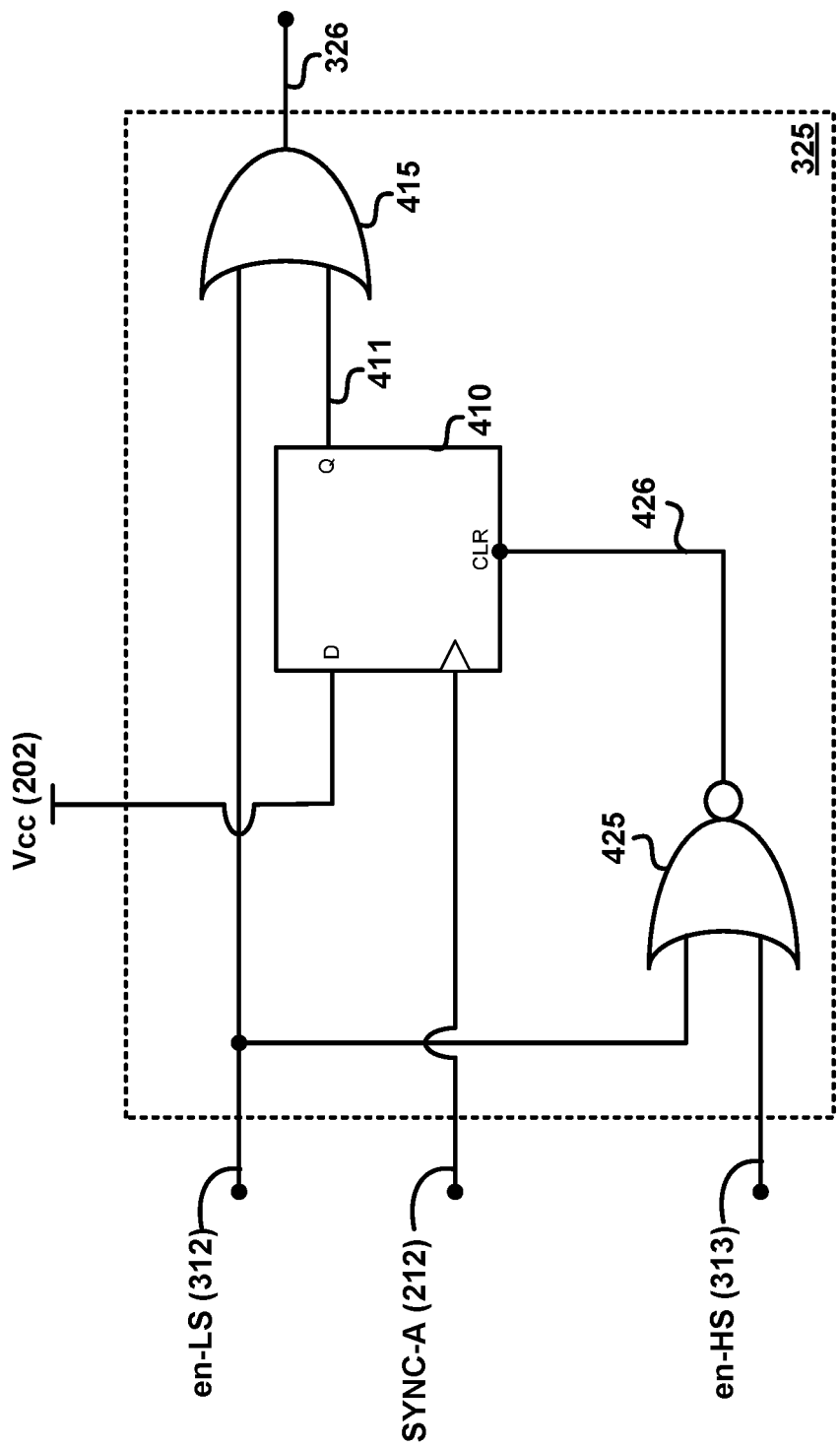
FIG. 4 is a block diagram illustrating the details of an activator block in an embodiment of the present disclosure.

FIG. 4 is a block diagram illustrating the details of an activator block in an embodiment of the present disclosure. Activator block 325 is shown containing flip-flop 410, NOR gate 425 and OR gate 415. Flip-flop 410 receives bias voltage Vcc (202) at its D input, output of NOR gate (425) on path 426 at its CLR input, and generates output (Q) on path 411. Flip-flop 410 is clocked by signal SYNC-A (212). In an embodiment, flip-flop 410 is implemented as a positive edge triggered flip-flop, with an active-low CLR input. Accordingly, flip-flop 410 operates to provide bias voltage Vcc (202) on path 411 at the first rising edge of SYNC-A (212), and resets Q output (sets output to zero) on path 411 when a logic LOW is received on path 426.

NOR gate 425 receives signal en-LS on path 312, signal en-HS on path 313, and generates NOR output on path 426. Accordingly, when either of en-LS (312) or en-HS (313) is a logic HIGH (i.e., PWM signal is transitioning between logic HIGH and logic LOW states), NOR gate generates a logic LOW on path 426, thereby resetting output of flip-flop 415 to logic LOW on path 411.

OR gate receives signal en-LS on path 312, output (Q) of flip-flop 410 on path 411, and generates OR output on path 326. Accordingly, when en-LS (312) is a logic HIGH, output 326 is a logic HIGH, irrespective of flip-flop output (411).

Activator block 325 operates to provide pump-voltage on path 326 upon receipt of signal SYNC-A (212), and prior to an initial transition of PWM signal. Pump-voltage in turn causes bootstrap capacitor to be pre-charged by charge-pump block 335 to a desired voltage. The implementation details of a charge-pump block in an embodiment are provided next.

6. Charge-pump Block

Figure 5:
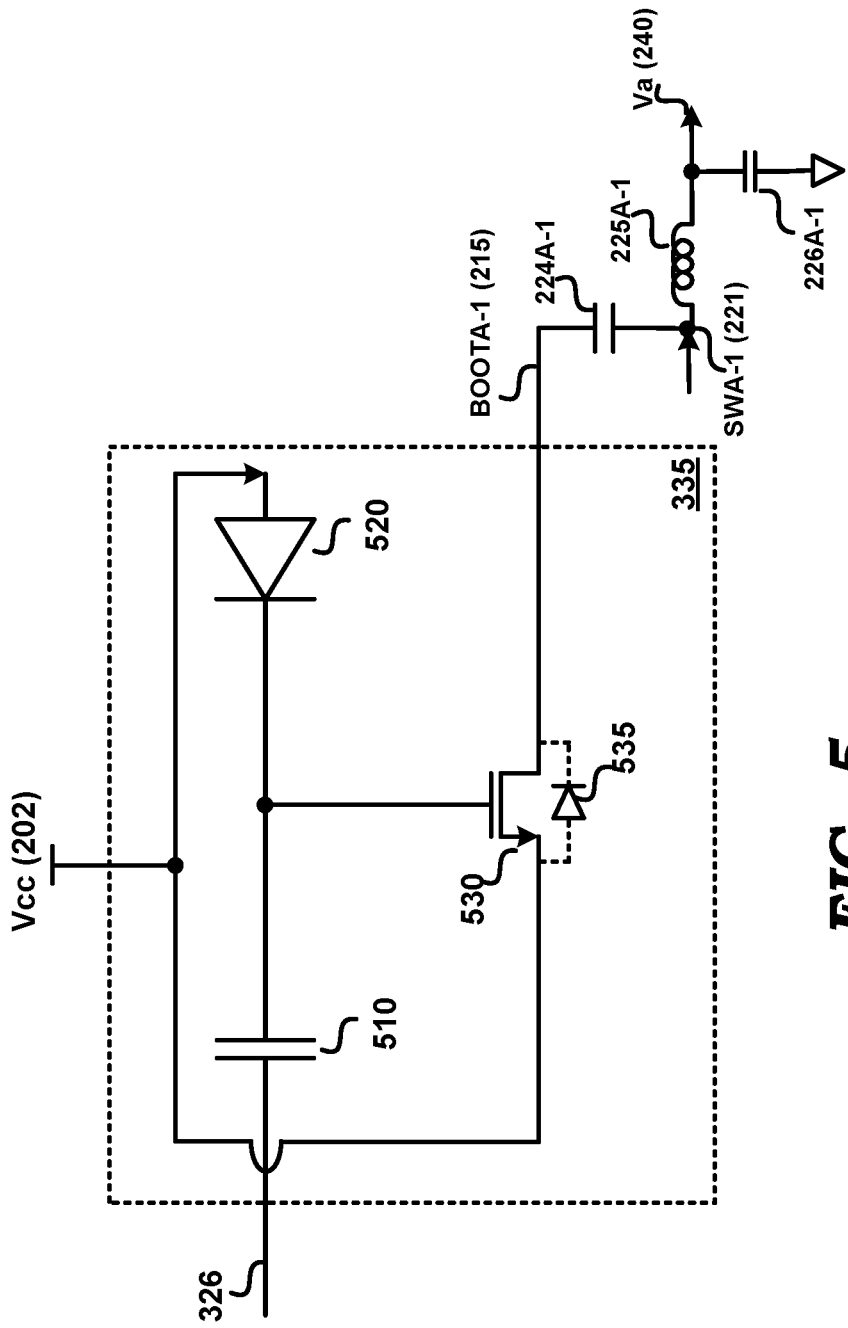
FIG. 5 is a block diagram illustrating the details of a charge-pump block in an embodiment of the present disclosure.

FIG. 5 is a diagram illustrating the details of a charge-pump block in an embodiment of the present disclosure. Charge-pump block 335 is shown containing pump-capacitor 510, switch 530 (with body-diode 535) and diode 520. FIG. 5 is also shown containing bootstrap capacitor 224A-1, inductor 225A-1 and output capacitor 226A-1. As noted above, charge-pump block 335 may be implemented differently in alternative embodiments, using fewer or more components and circuitry.

In an embodiment, diode 520 is implemented as a Schottky diode, and switch 530 is implemented as an n-type MOSFET. It is noted herein that the terms 'switch' and 'pump-transistor' are used interchangeably to refer to component 530. Body-diode 535 represents the intrinsic PN-junction diode between drain and source terminals of MOSFET 530, as is well known in the relevant arts. Pump-capacitor 510 is connected between output of activator block 325 and the cathode of diode 520. The anode of diode 520 is coupled to receive bias voltage Vcc (202).

The gate terminal of switch 530 is coupled to the junction of cathode of diode 520 and capacitor 510. The source terminal of switch 530 is coupled to bias voltage Vcc (202) and the drain terminal is coupled to boot node 215 (BOOTA-1).

As noted above, since switch 530 is implemented as an n-type MOSFET, the gate terminal of switch 530 needs to be driven to a voltage whose magnitude is higher than the voltage at the source terminal by at least a threshold value (Vth2) in order to turn the switch ON, as is well known in the relevant arts. Pump-capacitor 510 operates to provides the required magnitude of voltage at the gate terminal of switch 530. Pump-capacitor 510 charges when diode 520 is forward-biased. Voltage at the gate terminal of switch 530 increases by a magnitude equal to logic HIGH level of signal 411 (the first time following power-up or reset) and by logic HIGH of signal en-LS subsequently. The logic HIGH levels and logic LOW levels are received on path 326. When a logic LOW is received on path 326, voltage at the gate terminal of switch 530 is pulled down, thus turning OFF switch 530.

When switch 530 is turned ON, the voltage at boot node 215 (BOOTA-1) rises, thus charging bootstrap capacitor 224A-1. However, in the absence of activator block 325 and with only signal en-LS directly connected to path 326, bootstrap capacitor 224A-1 may be charged only when en-LS goes to logic HIGH. As noted above, if en-HS is a logic HIGH in the initial (first) transition of PWMA-1 (211) after power-up, the magnitude of charge on bootstrap capacitor may not be sufficient to fully turn-ON HS switch 340.

Specifically, the magnitude of voltage across bootstrap capacitor prior to the initial transition of signal PWMA-1 (211) equals bias voltage (Vcc, 202) minus the forward voltage drop of body-diode 535, which might not be sufficient to fully/strongly turn-ON HS switch 340 (i.e., to have very low ON-resistance). Instead, HS switch 340 may only be weakly turned-ON, and have a relatively large ON-resistance. A large value of ON-resistance of HS switch 340 may trigger in-built fault-detection conditions (not shown) and may potentially damage HS switch 340 due to large power dissipation ($I^2R$ loss). Therefore, it is desirable to pre-charge bootstrap capacitor prior to the initial transition of signal PWMA-1 (211), such that bootstrap capacitor is charged to a sufficiently large voltage to enable buffer 317 to fully turn-ON HS switch 340.

Figure 6:
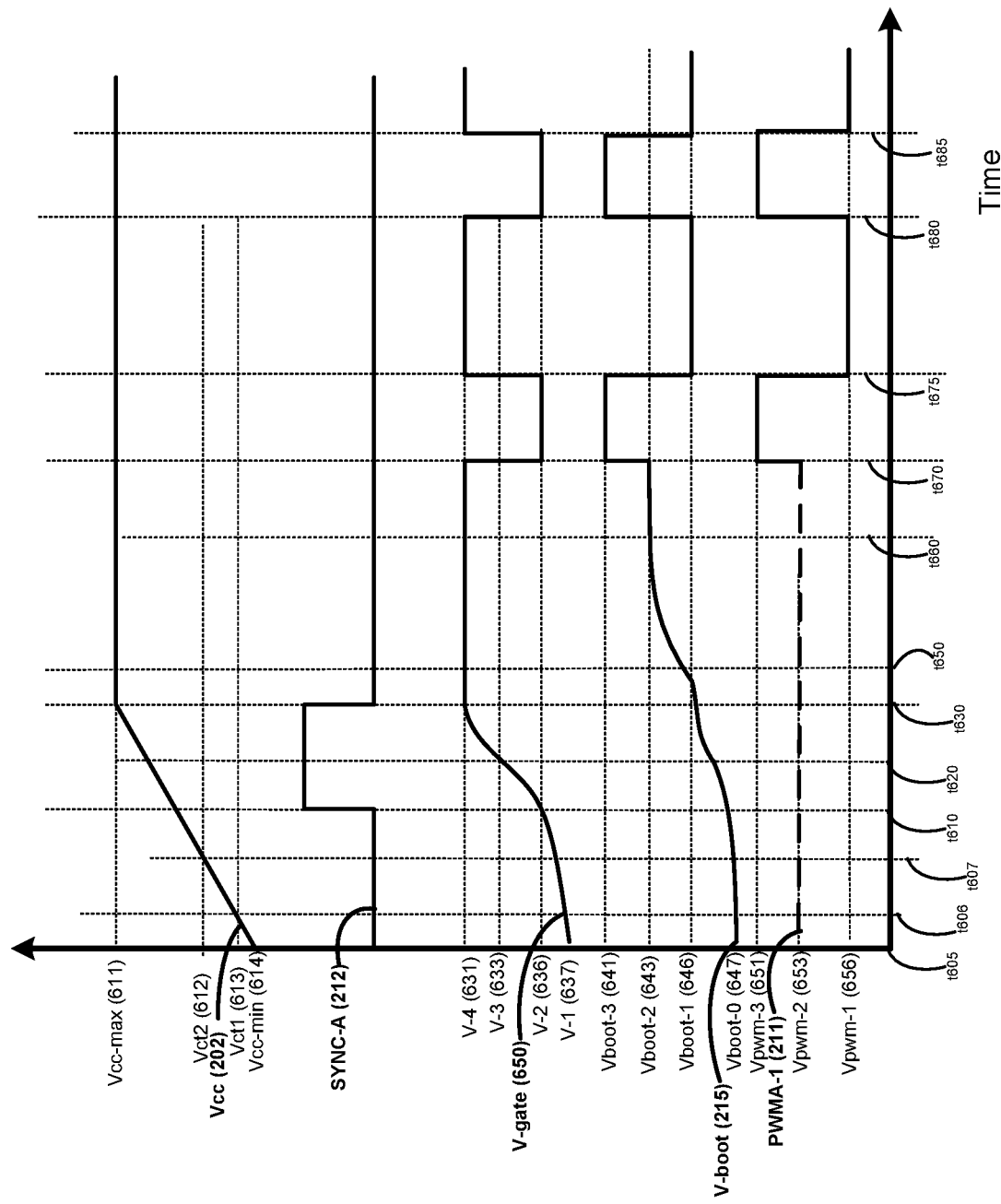
FIG. 6 is a timing diagram illustrating example waveforms of voltages at various nodes of an SPS in an embodiment of the present disclosure.

The manner in which bootstrap capacitor is charged during power-up of SPS by activator block 325 and charge-pump block 335, and waveforms at various nodes of the SPS are illustrated in the example waveforms and timing diagram of FIG. 6.

7. Charging Bootstrap Capacitor

FIG. 6 is an example timing diagram (not to scale) depicting voltages at various nodes during power-up of SPSA-1 (220-1). Specifically, there are shown waveforms of bias voltage Vcc at node 202, signal SYNC-A at node 212, voltage (V-gate, 650) at the gate terminal of pump-transistor 530, boot voltage (V-boot) at node 215, and signal PWMA-1 at node 211. It is noted herein that only waveforms as relevant to the understanding of the disclosure are depicted in FIG. 6. Although the changes in signals/voltages (such as PWMA-1, SYNC-A, etc.) are shown as step changes for simplicity, the changes typically occur in non-zero time intervals, as would be apparent to a skilled practitioner.

In operation, SPSA-1 (220-1) is powered-up just prior to t605. A 'power-up' also implies that the SPS that was previously inoperative (not generating output) is signaled by phase controller 210 to start functioning to generate output. At t605, bias voltage Vcc (202) has a value of zero (Vcc-min, 614), signal SYNC-A (212) is a logic LOW, voltage V-gate (650, representing the voltage at gate terminal of transistor 530) has a value of zero (V-1, 637), V-boot (215) has a value of zero (Vboot-0, 647), and signal PWMA-1 (211) is in high-Z state (Vpwm-2, 653). Further, although not depicted in FIG. 6, signals en-LS (312) and en-HS (313) would be at logic LOW as long as signal PWMA-1 (211) is in high-Z (high-impedance) state.

Bias voltage (Vcc) at node 202 is shown rising from zero (Vcc-min, 614) at t605 and reaching its steady-state value (Vcc-max, 611) at time instant t630. In the illustrative embodiment, the steady-state value of Vcc is 3.3 V. Referring now to FIG. 5, diode 520 is forward-biased when voltage at anode (Vcc, 202) exceeds the cut-in voltage (e.g., 0.2V, depicted as Vct1, 613 in FIG. 6) of diode 520 (at t606). Accordingly, starting from t606, voltage V-gate (650) is shown rising corresponding to rise in magnitude of Vcc (202), acquiring a magnitude of V-2 (636) at time instant t610.

The magnitude of V-gate (650) at a given time instant would be slightly (typically around 0.2-0.3 V) lesser than the magnitude of bias voltage (Vcc, 202), accounting for the drop across diode 510. Body-diode 535 is forward-biased when voltage at source terminal of switch 530 exceeds voltage at drain terminal by cut-in voltage (e.g., 0.6V, depicted as Vct2, 614 in FIG. 6) of body-diode 535. Accordingly, from t607, voltage V-boot (215) is shown rising corresponding to rise in magnitude of Vcc (202). It may be noted that the magnitude of V-boot (215) at time instant t620 would be slightly (typically around 0.7 V) lesser than the magnitude of bias voltage (Vcc, 202) at t620, accounting for the drop across body-diode 535.

At t610, a logic HIGH is received on path 212 (SYNC-A) while signal PWMA-1 (211) is in high-Z state. Referring now to FIG. 4, upon receiving a logic HIGH on path 212 (SYNC-A), flipflop 410 provides an output voltage (not shown) on path 411 with a magnitude equal to that of bias voltage (Vcc, 202). Accordingly, OR gate provides a logic HIGH on path 326 (representing pump-voltage). As depicted in FIG. 6, SYNC-A (212) is a pulse that operates to wake up SPS during power-up.

Referring now to FIG. 5, when pump-voltage (having a magnitude representing a logic HIGH) is received on path 326, voltage at the gate terminal of pump-transistor 530 is pushed up, as depicted by waveform V-gate (650) in duration t610-t630. As the voltage at the gate terminal rises in the duration t610-t630, the magnitude (V-3, 633) of voltage V-gate (650) exceeds the threshold voltage (Vth2) required to turn-ON switch 530 at t620. Accordingly, at t620, switch 530 is turned ON, and therefore voltage V-boot (215) rises further, as depicted at time instant t620.

Voltage V-gate (650) continues to rise in duration t620-t630 as signal SYNC-A (212) is a logic HIGH. Accordingly, V-gate (650) acquires magnitude V-4 (631) at time t630. At t650, shortly after magnitude of V-gate (650) reaches magnitude V-4 (631), V-boot (215) is shown rising steeply from magnitude Vboot-1 (646) at t650 to magnitude Vboot-2 (643) at t660. As is well known in the relevant arts, the ON-resistance of switch 530 (n-type MOSFET) is inversely proportional to gate-source voltage. Thus, when a larger magnitude of gate drive is provided to switch 530, ON-resistance of switch 530 decreases, and accordingly Vboot (215) rises steeply, and charges bootstrap capacitor 224A-1. The magnitude of Vboot-2 (643) is Vcc (202) minus the drop (around 200-300 mV) across switch 530.

It may be noted that during power-up of SPS, a duration of 25-30 micro-seconds is available (during which most of the analog blocks of the SPS are powered up, and accounts for the settling time of the blocks) between receipt of signal SYNC-A (212) and prior to the initial transition of signal PWMA-1 (211). Bootstrap capacitor 224A-1 is pre-charged during this time interval (as described above) and voltage across bootstrap capacitor 224A-1 may be 200-300 mV (due to drop across switch 530) less than Vcc. Had bootstrap capacitor 224A-1 not been pre-charged by activator block 325 during power-up, the voltage across bootstrap capacitor 224A-1 would have been 800-900 mV less than Vcc (due to the drop across body-diode 535) prior to the initial transition of signal PWMA-1 (211).

Thus, bootstrap capacitor 224A-1 may be charged to as close to bias voltage (Vcc, 202) as possible at power-up prior to an initial transition of PWM signal, and may provide the required gate drive for HS switch 350. Thereafter, steady-state switching (transitioning of signal PWMA-1, 211, between logic HIGH and logic LOW states) may further charge bootstrap capacitor 224A-1 to reach full charge/voltage Vcc in a corresponding number of cycles of PWMA-1.

At t670, signal PWMA-1 (211) transitions to logic HIGH state (represented by voltage level Vpwm-3, 651), thus causing en-HS to be logic HIGH and en-LS to be logic LOW. In an embodiment, logic LOW of PWM signal corresponds to a voltage level of zero V, and logic HIGH of PWM signal corresponds to a voltage level equal to 3.3 V.

The transition at t670 is the initial transition of signal PWM, and is typically received 25-30 micro-seconds after receipt of signal SYNC as noted above. This delay is depicted as duration t610-t670 in FIG. 6. Since bootstrap capacitor has already been charged close to bias voltage (Vcc, 202), bootstrap capacitor provides sufficient gate drive to fully turn ON HS switch and thus generate output at node Va (240). Thus, voltage (V-boot, 215) at boot node is pushed up when HS switch is ON, as depicted at time instant t670.

Referring to FIG. 4, at t670, when PWMA-1 (211) transitions to logic HIGH, en-HS goes to logic HIGH and thus, output of flip-flop is cleared (zero on path 411). Accordingly, output of OR gate is a logic LOW on path 326, thereby pulling pump-capacitor 510 (of FIG. 5) towards ground. Magnitude of V-gate (650) therefore decreases to V-2 (636), turning OFF pump-transistor 530.

At t675, signal PWMA-1 (211) transitions from logic HIGH to logic LOW state (represented by voltage level Vpwm-1, 656). en-LS goes to logic HIGH, output of OR gate is a logic HIGH on path 326, thereby pushing up voltage V-gate (650) to magnitude V-4 (631). Also, at t675, when en-LS (312) goes HIGH, voltage at node SWA-1 (221) is pulled to ground and accordingly voltage V-boot (215) decreases to Vboot-1 (646). Thus, as depicted in FIG. 6, voltage (V-gate, 650) at the gate terminal of switch 530 toggles between values V-2 (636) and V-4 (631), while voltage (V-boot, 215) at the boot node toggles between values Vboot-3 (641) and Vboot-1 (646), corresponding to transitions in PWM signal.

Assuming example values of Vin=21 V, Vcc/Vcc=3.3 V, drop (Vsw) across switch 530 in fully ON state=0.3 V, forward drop (Vdiode) across diode 520=0.2 V, logic HIGH (Vh)=3.3 V, logic-LOW (Vlow)=0V in the illustrative embodiment, the various example magnitudes of voltages V-gate (650) and V-boot (215) are:

$$V\text{-}4(631)=Vcc-\text{Vdiode}+Vh=3.3-0.2+3.3V=6.4V$$

$$V\text{-}2(636)=Vcc-\text{Vdiode}=3.3-0.2=3.1V$$

$$V\text{boot-}1(646)=Vcc-Vsw=3.3-0.3=3.0V$$

$$V\text{boot-}3(641)=Vin+Vcc-Vsw=21+3.3-0.3=24V$$

It may be appreciated that if the initial transition of PWMA-1 (211) is to logic LOW instead of logic HIGH at t670, en-LS goes to logic HIGH, and LS switch 340 is turned ON, thus providing output at node Va (240). Since bootstrap capacitor is already pre-charged prior to the initial transition of signal PWMA-1 (211), at the next transition of PWMA-1 (211) from logic LOW to logic HIGH, bootstrap capacitor provides the required gate drive to turn-ON HS switch 350, thus providing output voltage at node Va (240).

Thus, aspects of the present disclosure operate to pre-charge bootstrap capacitor to ensure desired operation in various scenarios.

8. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1-5, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A voltage regulator comprising:
   a bootstrap capacitor;
   a switching converter to generate an output voltage on a first node based on an input voltage received on a second node after receipt of a wake-up signal received on a third node, said output voltage being generated under the control of a control signal received on a fourth node,
   said switching converter comprising a high-side switch and a low-side switch that together are operated to generate said output voltage based on said control signal transitioning between a first logic state and a second logic state, wherein one of said low-side switch and said high-side switch is in ON state when said control signal is in said first logic state, and the other one of said low-side switch and said high-side switch is in ON state when said control signal is in said second logic state,
   wherein said high-side switch is required to be driven by a second voltage exceeding a first threshold voltage for said high-side switch to be in said ON state for generating said output voltage, said bootstrap capacitor providing said second voltage upon being charged; and a pre-charging block for charging said bootstrap capacitor to said second voltage upon receipt of said wake-up signal, wherein said pre-charging block completes charging of said bootstrap capacitor to said second voltage in a duration between said receipt of said wake-up signal and a commencement of transitions of said control signal between said first logic state and said second logic state, wherein said control signal is in a high-impedance state in said duration before said commencement, wherein said wake-up signal is received when said control signal is in said high-impedance state.

2. The voltage regulator of claim 1, wherein said pre-charging block generates a boot voltage for charging said bootstrap capacitor upon receipt of said wakeup signal, wherein said pre-charging block is operative not to generate said boot voltage in absence of receipt of said wakeup signal.

3. The voltage regulator of claim 2, wherein said high-side switch is ON when said control signal is in said first logic state, and said low-side switch is ON when said control signal is in said second logic state, wherein each of said high-side switch and said low-side switch provide said output voltage only when ON.

4. The voltage regulator of claim 3, wherein said control signal is in a high-impedance state before said initial transition, wherein said wake-up signal is received when said control signal is in said high-impedance state.

5. The voltage regulator of claim 3, wherein said high-side switch is an n-type MOSFET (Metal Oxide Semiconductor Field Effect Transistor) comprising a gate terminal required to be biased exceeding said first threshold voltage for being turned ON, wherein said bootstrap capacitor is coupled to provide said second voltage to said gate terminal, wherein biasing at said second voltage causes said high-side switch to fully turn-ON.

6. The voltage regulator of claim 5, wherein said pre-charging block comprises:

an activator block to generate a pump-voltage upon receipt of said wake-up signal; and a charge-pump block to generate said boot voltage upon receipt of said pump-voltage.

7. The voltage regulator of claim 6, wherein said activator block comprises:

a NOR gate coupled to receive a low-side driver signal and a high-side driver signal and to generate a NOR-output, wherein said low-side driver signal and said high-side driver signal are derived from said control signal;

a flip-flop coupled to receive a bias voltage on a data input, said wake-up signal on a clock input and said NOR-output on clear input, said flip-flop to generate a flip-flop output signal; and an OR gate coupled to receive said low-gate driver signal and output of said flip-flop, and to generate OR-output as said pump-voltage.

8. The voltage regulator of claim 7, wherein said charge-pump block comprises:

a pump-capacitor;

a diode coupled to receive said bias voltage at an anode; and a pump-transistor, wherein said pump-capacitor is coupled between said OR-gate and a cathode of said diode, wherein a gate terminal of said pump-transistor is coupled to cathode of said diode, a first current terminal is coupled to said bias voltage and a second current terminal coupled to said boot node.

9. The voltage regulator of claim 8, wherein said pump-transistor is implemented as an n-type MOSFET and said diode is implemented as Schottky diode, wherein said gate terminal of said pump-transistor is required to be biased at a fourth voltage exceeding a third threshold voltage for being turned ON, wherein said pump-capacitor is coupled to provide said fourth voltage to said gate terminal of said pump-transistor.

10. The voltage regulator of claim 9, wherein said pump-voltage generated upon receipt of said wake-up signal causes said pump-capacitor to provide said fourth voltage.

11. A method of charging a bootstrap capacitor associated with a switching converter, wherein a high-side switch and a low-side switch of said switching converter together operate to generate an output voltage based on a control signal transitioning between a first logic state and a second logic state, wherein one of said low-side switch and said high-side switch is in ON state when said control signal is in said first logic state, and the other one of said low-side switch and said high-side switch is in ON state when said control signal is in said second logic state, said method comprising:

receiving a wake-up signal; and charging said bootstrap capacitor to a second voltage exceeding a first threshold voltage upon receipt of said wake-up signal, wherein said high-side switch is required to be driven by said second voltage for said high-side switch to be in said ON state for generating said output voltage, said bootstrap capacitor providing said second voltage upon being charged, wherein said charging completes charging of said bootstrap capacitor to said second voltage in a duration between said receipt of said wake-up signal and a commencement of transitions of said control signal between said first logic state and said second logic state, wherein said control signal is in a high-impedance state before said commencement, wherein said wake-up signal is received when said control signal is in said high-impedance state.

12. The method of claim 11, wherein said charging said bootstrap capacitor is performed only upon receipt of said wakeup signal.

13. The method of claim 12, wherein said high-side switch is ON when said control signal is in said first logic state, and said low-side switch is ON when said control signal is in said second logic state, wherein each of said high-side switch and said low-side switch provide said output voltage only when ON.

14. The method of claim 13, wherein said control signal is in a high-impedance state before said initial transition, wherein said wake-up signal is received when said control signal is in said high-impedance state.

15. The method of claim 14, wherein said high-side switch is an n-type MOSFET (Metal Oxide Semiconductor Field Effect Transistor) comprising a gate terminal required to be biased exceeding said threshold voltage for being turned ON, wherein said bootstrap capacitor is coupled to provide said second voltage to said gate terminal, wherein biasing at said second voltage causes said high-side switch to fully turn-ON.

16. An apparatus for charging a bootstrap capacitor associated with a switching converter, wherein a high-side switch and a low-side switch of said switching converter together operate to generate an output voltage based on a control signal transitioning between a first logic state and a second logic state, wherein one of said low-side switch and said high-side switch is in ON state when said control signal is in said first logic state, and the other one of said low-side switch and said high-side switch is in ON state when said control signal is in said second logic state, said apparatus comprising:

means for receiving a wake-up signal; and means for charging said bootstrap capacitor to a second voltage exceeding a first threshold voltage upon receipt of said wake-up signal, wherein said high-side switch of said switching converter is required to be driven by said second voltage for said high-side switch to be in said ON state for generating said output voltage, said bootstrap capacitor providing said second voltage upon being charged, wherein said means for charging completes charging of said bootstrap capacitor to said second voltage in a duration between said receipt of said wake-up signal and a commencement of transitions of said control signal between said first logic state and said second logic state, wherein said control signal is in a high-impedance state before said commencement, wherein said wake-up signal is received when said control signal is in said high-impedance state.

17. The apparatus of claim 16, wherein said means for charging charges said bootstrap capacitor only upon receipt of said wakeup signal.

18. The apparatus of claim 17, wherein said high-side switch is ON when said control signal is in said first logic state, and said low-side switch is ON when said control signal is in said second logic state, wherein each of said high-side switch and said low-side switch provide said output voltage only when ON.

19. The apparatus of claim 18, wherein said control signal is in a high-impedance state before said initial transition, wherein said wake-up signal is received when said control signal is in said high-impedance state.

20. The apparatus of claim 19, wherein said high-side switch is an n-type MOSFET (Metal Oxide Semiconductor Field Effect Transistor) comprising a gate terminal required to be biased exceeding said threshold voltage for being turned ON, wherein said bootstrap capacitor is coupled to provide said second voltage to said gate terminal, wherein biasing at said second voltage causes said high-side switch to fully turn-ON.

\* \* \* \* \*